United States Patent
Sawa et al.

(10) Patent No.: US 9,070,940 B2
(45) Date of Patent: Jun. 30, 2015

(54) LITHIUM SECONDARY BATTERY AND METHOD FOR MANUFACTURING THE SAME

(75) Inventors: Shouichiro Sawa, Hyogo (JP); Atsushi Fukui, Hyogo (JP); Taizou Sunano, Hyogo (JP)

(73) Assignee: SANYO Electric Co., Ltd., Daito-shi (JP)

( * ) Notice: Subject to any disclaimer, the term of this patent is extended or adjusted under 35 U.S.C. 154(b) by 65 days.

(21) Appl. No.: 14/004,245

(22) PCT Filed: Mar. 16, 2012

(86) PCT No.: PCT/JP2012/056845
§ 371 (c)(1),
(2), (4) Date: Sep. 10, 2013

(87) PCT Pub. No.: WO2012/132958
PCT Pub. Date: Oct. 4, 2012

(65) Prior Publication Data
US 2014/0004415 A1     Jan. 2, 2014

(30) Foreign Application Priority Data

Mar. 31, 2011    (JP) .................................. 2011-079254

(51) Int. Cl.
*H01M 4/36* (2006.01)
*H01M 4/131* (2010.01)
(Continued)

(52) U.S. Cl.
CPC .............. *H01M 4/364* (2013.01); *Y02E 60/122* (2013.01); *H01M 4/131* (2013.01); *H01M 4/134* (2013.01); *H01M 4/386* (2013.01); *H01M 4/525* (2013.01); *H01M 4/625* (2013.01); *H01M 10/0525* (2013.01); *H01M 2004/021* (2013.01); *Y02T 10/7011* (2013.01)

(58) Field of Classification Search
None
See application file for complete search history.

(56) References Cited

U.S. PATENT DOCUMENTS 6,051,340 A * 4/2000 Kawakami et al. ...... 429/231.95
6,468,693 B1 * 10/2002 Takami et al. ................ 429/176
(Continued)

FOREIGN PATENT DOCUMENTS

JP    2002-222648 A    8/2002
JP    2002-260637 A    9/2002
(Continued)

OTHER PUBLICATIONS

International Search Report for PCT/JP2012/056845, Mailing Date of May 22, 2012.

*Primary Examiner* — Gregg Cantelmo
(74) *Attorney, Agent, or Firm* — Westerman, Hattori, Daniels & Adrian, LLP (57) ABSTRACT

A lithium secondary battery with superior cycle performance is provided. The lithium secondary battery includes a negative electrode including a negative electrode active material layer disposed on a negative electrode current collector and containing negative electrode active material particles, negative electrode conductor particles, and a negative electrode binder; a positive electrode containing a positive electrode active material; and a non-aqueous electrolyte. The concentration of the negative electrode conductor particles in a surface layer of the negative electrode active material layer facing away from the negative electrode current collector is higher than the concentration of the negative electrode conductor particles in a center of the negative electrode active material layer.

6 Claims, 5 Drawing Sheets (51) Int. Cl.
*H01M 4/134* (2010.01)
*H01M 4/38* (2006.01)
*H01M 4/525* (2010.01)
*H01M 4/62* (2006.01)
*H01M 10/0525* (2010.01)
*H01M 4/02* (2006.01)

(56) References Cited

U.S. PATENT DOCUMENTS

2007/0054190 A1   3/2007   Fukui et al.
2008/0160407 A1 * 7/2008   Ishii et al. .................. 429/218.1
2008/0176132 A1   7/2008   Hirose et al.
2011/0281166 A1 * 11/2011  Cho et al. ..................... 429/221

FOREIGN PATENT DOCUMENTS

| | | |
|---|---|---|
| JP | 2007-073334 A | 3/2007 |
| JP | 2007-257868 A | 10/2007 |
| JP | 2009-104900 A | 5/2009 |
| JP | 2010-165471 A | 7/2010 |
| JP | 2010-182479 A | 8/2010 |
| WO | WO 2009031037 A2 * | 3/2009 |

* cited by examiner

Figure 9

LITHIUM SECONDARY BATTERY AND METHOD FOR MANUFACTURING THE SAME

TECHNICAL FIELD

The present invention relates to lithium secondary batteries and methods for manufacturing lithium secondary batteries.

BACKGROUND ART

PTL 1 discloses a negative electrode formed by sintering an active material layer containing an active material made of a silicon-containing material and a polyimide binder in a non-oxidizing atmosphere.

CITATION LIST

Patent Literature

PTL 1: Japanese Published Unexamined Patent Application No. 2002-260637

SUMMARY OF INVENTION

Technical Problem

There is a need for a lithium secondary battery with improved charge-discharge cycle performance that uses a silicon-containing material as a negative electrode active material.

An object of the present invention is to provide a lithium secondary battery with superior cycle performance and a method of manufacturing such a lithium secondary battery.

Solution to Problem

A lithium secondary battery of the present invention includes a negative electrode. The negative electrode includes a negative electrode current collector and a negative electrode active material layer. The negative electrode active material layer is disposed on the negative electrode current collector. The negative electrode active material layer contains negative electrode active material particles, negative electrode conductor particles, and a negative electrode binder. The concentration of the negative electrode conductor particles in a surface layer of the negative electrode active material layer facing away from the negative electrode current collector is higher than the concentration of the negative electrode conductor particles in a center of the negative electrode active material layer.

A method of the present invention for manufacturing a lithium secondary battery is a method by which the lithium secondary battery of the present invention can be manufactured. The method of the present invention for manufacturing a lithium secondary battery includes preparing a negative electrode mixture slurry containing the negative electrode active material particles, the negative electrode conductor particles, and the negative electrode binder and having a viscosity of 70 to 120 mPa·s; and forming the negative electrode active material layer by applying the negative electrode mixture slurry to the negative electrode current collector and drying the applied negative electrode mixture slurry with an initial drying temperature set to 100° C. to 150° C.

Advantageous Effects of Invention

According to the present invention, a lithium secondary battery with superior cycle performance and a method for manufacturing such a lithium secondary battery can be provided.

BRIEF DESCRIPTION OF DRAWINGS

FIG. 1 is a schematic perspective view showing an electrode assembly fabricated in the Examples. In FIG. 1, the hatched area does not represent a cross-section.

FIG. 2 is a schematic plan view showing a lithium secondary battery fabricated in the Examples. In FIG. 2, the hatched area does not represent a cross-section.

FIG. 3 is an oxygen element (O) mapping image of the cross-section of the negative electrode of Example 1.

DESCRIPTION OF EMBODIMENTS

In a lithium secondary battery according to a first embodiment, the concentration of negative electrode conductor particles in a surface layer of a negative electrode active material layer facing away from a negative electrode current collector is higher than the concentration of the negative electrode conductor particles in the center of the negative electrode active material layer. Typically, the surface layer of the negative electrode active material layer facing away from the negative electrode current collector is in contact with a separator. The separator retains a large amount of electrolyte solution. If the surface layer of the negative electrode active material layer facing away from the negative electrode current collector contains a large amount of negative electrode conductor particles with high liquid retention and absorbency, the electrolyte solution retained in the separator can be efficiently supplied to the negative electrode active material layer. This results in a smooth supply of lithium ions to the negative electrode active material particles, thereby inhibiting degradation of the negative electrode active material particles and providing good charge-discharge performance.

The negative electrode active material particles preferably have a larger average particle size than the negative electrode conductor particles. In this case, when a negative electrode mixture slurry applied to the negative electrode current collector is dried, the negative electrode conductor particles, having a smaller average particle size, move more readily toward the surface of the negative electrode active material layer facing away from the negative electrode current collector as the solvent component in the negative electrode mixture slurry evaporates. This tends to increase the concentration of the negative electrode conductor particles in the surface layer of the negative electrode active material layer facing away from the negative electrode current collector. More preferably, the negative electrode active material particles have a 2 to 10 μm larger average particle size than the negative electrode conductor particles. If the negative electrode active material particles have an insufficient average particle size as compared to the negative electrode conductor particles, it may be difficult to increase the concentration of the negative electrode conductor particles in the surface layer of the negative electrode active material layer facing away from the negative electrode current collector. If the negative electrode active material particles have an excessive average particle size as compared to the negative electrode conductor particles, the particles contained in the negative electrode mixture slurry may be poorly dispersed during the preparation of the negative electrode mixture slurry.

Specifically, the negative electrode active material particles preferably have an average particle size of 7 to 12 μm. The negative electrode conductor particles preferably have an average particle size of 2 to 5 μm. If the negative electrode active material particles have an excessive average particle size, they will experience an excessive change in volume during charge. This may decrease the adhesion between the negative electrode active material layer and the negative electrode current collector.

The negative electrode conductor particles preferably have a larger BET specific surface area than the negative electrode active material particles. In this case, the negative electrode conductor particles have a higher liquid retention than the negative electrode active material particles. Such negative electrode conductor particles are more effective in improving the liquid retention of the negative electrode. More preferably, the negative electrode conductor particles have a BET specific surface area of 7 to 15 $m^2/g$. If the negative electrode conductor particles have an insufficient BET specific surface area, the negative electrode conductor particles may have low liquid retention, thus resulting in poor charge-discharge performance. If the negative electrode conductor particles have an excessive BET specific surface area, the negative electrode binder will be present in large amounts around the negative electrode conductor particles and consequently in small amounts around the negative electrode active material particles. This may decrease the adhesion between the negative electrode active material particles, thus resulting in poor charge-discharge performance.

The negative electrode conductor particles can be, for example, metal particles or a carbon material such as carbon black. Preferably, the negative electrode conductor particles are a carbon material, more preferably graphite particles. Graphite particles have numerous voids, which make graphite particles less dense than NMP. Therefore, if the negative electrode conductor particles are graphite particles, they move readily to the surface layer of the negative electrode active material layer facing away from the negative electrode current collector as the negative electrode mixture slurry is dried.

The negative electrode active material layer preferably contains the negative electrode conductor particles in an amount of 1% to 10% by mass of the negative electrode active material. If the negative electrode active material layer contains an insufficient amount of negative electrode conductor particles, the properties such as cycle performance might not be sufficiently improved. If the negative electrode active material layer contains an excessive amount of negative electrode conductor particles, the negative electrode binder will be present in small amounts around the negative electrode active material particles. This may decrease the adhesion between the negative electrode active material particles and may also decrease the adhesion between the negative electrode active material layer and the negative electrode current collector, thus resulting in poor charge-discharge performance.

The negative electrode active material particles contain at least one of silicon and a silicon-containing alloy. Examples of silicon alloys include solid solutions, intermetallic compounds, and eutectic alloys of silicon with at least one other element. Examples of methods for preparing silicon-containing alloys include arc melting, melt quenching, mechanical ironing, sputtering, chemical vapor deposition, and firing. Examples of melt quenching processes include single-roller quenching, double-roller quenching, and atomization such as gas atomization, water atomization, and disk atomization.

Alternatively, the negative, electrode active material particles may be particles of at least one of silicon and a silicon alloy that are coated with a material such as a metal or alloy. The negative electrode active material particles may include a core containing at least one of silicon and a silicon alloy and a coating, surrounding the core, of a material such as a metal or alloy. Examples of methods for coating the core with the coating include electroless plating, electrolytic plating, chemical reduction, evaporation, sputtering, and chemical vapor deposition.

The negative electrode binder is preferably, for example, a polyimide resin prepared by imidation of a tetracarboxylic anhydride with a diamine. A polyimide resin prepared by imidation of a tetracarboxylic anhydride with a diamine can be formed, for example, by reacting an ester of a tetracarboxylic anhydride and an alcohol with a diamine compound. Specifically, a negative electrode current collector having thereon a layer containing a mixture of an ester compound of a tetracarboxylic anhydride and an alcohol and a diamine is heat-treated in a non-oxidizing atmosphere. This causes a polymerization reaction and an imidation reaction between the ester compound and the diamine. Thus, a negative electrode active material layer containing a polyimide resin prepared by imidation of a tetracarboxylic anhydride with a diamine can be formed.

A mixture of polyimide resin monomers, i.e., a mixture of an ester compound of a tetracarboxylic anhydride and an alcohol and a diamine, may be used as a binder precursor. In this case, the binder precursor has a lower viscosity than a polymeric binder precursor such as a polyamic acid, which is a common polyimide resin precursor. The binder precursor can therefore easily enter irregularities in the surface of the negative electrode active material particles, for example, during the preparation or application of the negative electrode mixture slurry. This improves the anchor effect between the negative electrode active material particles and the binder and the anchor effect between the negative electrode current collector and the binder. Thus, the adhesion between the negative electrode active material particles and the adhesion between the negative electrode active material layer and the negative electrode current collector can be further improved. The low viscosity of the binder precursor also allows the negative electrode conductor particles to move readily toward the side of the negative electrode active material layer facing away from the negative electrode current collector. This increases the concentration of the negative electrode conductor particles in the surface layer of the negative electrode active material layer facing away from the negative electrode current collector.

Examples of alcohols for esterifying the tetracarboxylic anhydride include compounds having one alcoholic hydroxy group. Examples of compounds having one alcoholic hydroxy group include aliphatic alcohols such as methanol, ethanol, isopropanol, and butanol.

The negative electrode binder is preferably a polyimide resin prepared by imidation of a tetracarboxylic anhydride with a diamine. In this case, the tetracarboxylic anhydride preferably contains at least one of a tetracarboxylic anhydride represented by formula (1) below and a tetracarboxylic anhydride represented by formula (2) below.

The diamine preferably contains a diamine represented by formula (3) below.

[Chem. 1]

(1)

[Chem. 2]

(2)

[Chem. 3]

(3)

If the negative electrode mixture slurry contains the tetracarboxylic anhydride represented by formula (1) and the diamine represented by formula (3), the tetracarboxylic anhydride and the diamine undergo a polymerization reaction and an imidation reaction during the heat treatment of the negative electrode active material layer to form a polyimide resin having a structure represented by formula (4) below. If the negative electrode mixture slurry contains the tetracarboxylic anhydride represented by formula (2) and the diamine represented by formula (3), the tetracarboxylic anhydride and the diamine undergo a polymerization reaction and an imidation reaction during the heat treatment of the negative electrode active material layer to form at least one of a polyimide resin having a structure represented by formula (5) below.

[Chem. 4]

(4)

[Chem. 5]

(5)

The polyimide resin having the structure represented by formula (4) and the polyimide resin having the structure represented by formula (5) have superior mechanical strength and adhesion. Therefore, if the negative electrode active material layer contains the polyimide resin having the structure represented by formula (4) or (5), the adhesion between the negative electrode active material particles and the adhesion between the negative electrode active material layer and the negative electrode current collector can be improved. This results in superior charge-discharge performance.

Other preferred tetracarboxylic anhydrides include aromatic tetracarboxylic dianhydrides such as 1,2,4,5-benzenetetracarboxylic 1,2:4,5-dianhydride (also known as pyromellitic dianhydride), 3,3',4,4'-diphenylsulfonetetracarboxylic dianhydride, 3,3',4,4'-diphenyl ether tetracarboxylic dianhydride, and 3,3',4,4'-diphenylmethanetetracarboxylic dianhydride.

Other preferred diamines include aromatic diamines such as p-phenylenediamine, 3,3'-diaminobenzophenone, 4,4'-diaminobiphenyl, 4,4'-diaminodiphenylsulfone, 4,4'-diaminophenyl ether, 4,4'-diaminophenylmethane, 2,2-bis(4-(4-aminophendxy)phenyl)propane, 1,4-bis(3-aminophenoxy)benzene, and 1,4-bis(4-aminophenoxy)benzene.

The negative electrode binder may further contain a polycarboxylic anhydride having a valence of 6 or more and a polyamine having a valence of 3 or more. The polycarboxylic anhydride undergoes a polymerization reaction and an imidation reaction with the diamine and the polyamine during the heat treatment of the negative electrode active material layer. As a result, a polyimide resin having a crosslinked structure is formed. The polyamine undergoes a polymerization reaction and an imidation reaction with the tetracarboxylic anhydride and the polycarboxylic anhydride during the heat treatment of the negative electrode active material layer. As a result, a polyimide resin having a crosslinked structure is formed. A polyimide resin having a crosslinked structure has superior mechanical strength, which further improves the strength of the negative electrode binder. Thus, better charge-discharge performance can be achieved.

Examples of polycarboxylic anhydrides include benzenehexacarboxylic trianhydride (mellitic anhydride), which is the anhydride of benzenehexacarboxylic acid (mellitic acid), and 1,2,3,4,5,6-cyclohexanehexacarboxylic anhydride.

Examples of polyamines include aromatic triamines such as tris(4-aminophenyl)methanol (also known as pararosaniline), tris(4-aminophenyl)methane, 3,4,4'-triaminodiphenyl ether, 3,4,4'-triaminobenzophenone, 3,4,4'-triaminodiphenylmethane, 1,4,5-triaminonaphthlene, tris(4-aminophenyl)amine, 1,2,4-triaminobenzene, and 1,3,5-triaminobenzene. Other examples of polyamines include triamines such as 2,4,6-triamino-1,3,5-triazine (also known as melamine) and 1,3,5-triaminocyclohexane; and tetramines such as tetrakis(4-aminophenyl)methane, 3,3',4,4'-tetraaminodiphenyl ether, 3,3',4,4'-tetraaminobenzophenone, 3,3',4, 4'-tetraaminodiphenylmethane, and N,N,N'N'-tetrakis(4-methylphenyl)benzidine.

The negative electrode current collector may be made of, for example, a conductive metal foil. Examples of conductive metal foils include foils of metals such as copper, nickel, iron, titanium, cobalt, manganese, tin, silicon, chromium, and zirconium and alloys containing at least one of these metals. The negative electrode current collector is preferably made of a conductive metal foil containing a metal element that diffuses readily into the active material particles. Specifically, the negative electrode current collector is preferably made of a foil of copper or a copper-containing alloy.

The negative electrode current collector may have a thickness of, for example, about 10 to 100 μm.

Examples of preferred positive electrode active materials include lithium transition metal composite oxides containing elements such as cobalt, nickel, and manganese. Examples of lithium transition metal composite oxides include $LiCoO_2$ and lithium transition metal composite oxides represented by $Li_aNi_{1-b-c}Co_bAl_cO_2$ (where a, b, and c satisfy $0<a\leq1.1$, $0.1\leq b\leq0.3$, and $0.03\leq c\leq0.10$).

Lithium transition metal composite oxides represented by $Li_aNi_{1-b-c}Co_bAl_cO_2$ (where a, b, and c satisfy $0<a\leq1.1$, $0.1\leq b\leq0.3$, and $0.03\leq c\leq0.10$) have a high Ni composition ratio. When used as a positive electrode active material, such a lithium transition metal composite oxide having a high Ni composition ratio allows for a higher weight energy density in the same potential range than a lithium transition metal composite oxide having a low Ni composition ratio, such as $LiCoO_2$. Thus, the use of a lithium transition metal composite oxide having a high Ni composition ratio as a positive electrode active material increases the energy density of lithium secondary batteries. However, during charge, a large amount of Li is extracted from the lithium transition metal composite oxide having a high Ni composition ratio. This tends to degrade the crystal structure of the lithium transition metal composite oxide having a high Ni composition ratio, for example, during charge. In general, metal components such as Ni and Co dissolve from the degraded crystal structure. These dissolved components, such as Ni and Co, migrate to reach the surface of the negative electrode during charge and discharge. Upon reaching the surface of the negative electrode, the dissolved components undergo a side reaction with the electrolyte solution on the surface of the negative electrode. The negative electrode conductor particles function as a filter for capturing the dissolved components; therefore, if the negative electrode conductor particles are present in large amounts in the surface layer of the negative electrode active material layer facing away from the negative electrode current collector, the side reaction between the dissolved components, such as Ni and Co, and the electrolyte solution is readily inhibited. Thus, if a lithium transition metal composite oxide represented by $Li_aNi_{1-b-c}Co_bAl_cO_2$ (where a, b, and c satisfy $0<a\leq1.1$, $0.1\leq b\leq0.3$, and $0.03\leq c\leq0.10$) is to be used as a positive electrode active material, it is effective to use a negative electrode in which the negative electrode conductor particles are present in large amounts in the surface layer of the negative electrode active material layer facing away from the negative electrode current collector.

Examples of solvents preferred for the non-aqueous electrolyte include cyclic carbonates such as ethylene carbonate, propylene carbonate, butylene carbonate, and fluoroethylene carbonate; linear carbonates such as dimethyl carbonate, methyl ethyl carbonate, and diethyl carbonate; and mixed solvents of cyclic and linear carbonates.

Examples of solutes preferred for the non-aqueous electrolyte include $LiPF_6$, $LiBF_4$, $LiCF_3SO_3$, $LiN(CF_3SO_2)_2$, $LiN(C_2F_5SO_2)_2$, $LiN(CF_3SO_2)(C_4F_9SO_2)$ $LiC(C_2F_5SO_2)_3$, and mixtures thereof. The non-aqueous electrolyte may also be a gel polymer electrolyte made of a polymer electrolyte, such as polyethylene oxide or polyacrylonitrile, impregnated with an electrolyte solution or an inorganic solid electrolyte such as LiI or $Li_3N$.

The non-aqueous electrolyte preferably contains $CO_2$.

The negative electrode mixture slurry used for the manufacture of the lithium secondary battery preferably has a viscosity of 70 to 120 mPa·s. If the negative electrode mixture slurry has insufficient viscosity, it may be difficult, for example, to handle the negative electrode mixture slurry and therefore to control the thickness of the negative electrode active material layer during application. If the negative electrode mixture slurry has excessive viscosity, few negative electrode conductor particles may move to the surface layer of the negative electrode active material layer facing away from the negative electrode current collector during the drying of the negative electrode mixture slurry applied to the negative electrode current collector.

The negative electrode mixture slurry applied to the negative electrode current collector is preferably dried with the initial drying temperature set to 100° C. to 150° C. If the initial drying temperature is insufficient, the solvent component in the negative electrode mixture slurry will evaporate at low speed during drying. This may allow few negative electrode conductor particles to move to the surface layer of the negative electrode active material layer facing away from the negative electrode current collector. If the initial drying temperature is excessive, the function of the negative electrode binder may decrease due to thermal degradation. If the initial drying temperature is excessive, little negative electrode conductor may move to the surface layer of the negative electrode active material layer facing away from the negative electrode current collector.

After the drying of the negative electrode mixture slurry, the negative electrode active material layer is preferably heat-treated in a non-oxidizing atmosphere. The heat treatment temperature is preferably below the temperature at which the amount of negative electrode binder decrease by 5% by mass. If the negative electrode binder has a glass transition temperature, the heat treatment temperature is preferably above the glass transition temperature of the negative electrode binder. If the temperature of the negative electrode active material layer exceeds the glass transition temperature of the negative electrode binder, the negative electrode binder will become a plastic region. The negative electrode binder can therefore easily enter irregularities in the surface of the negative electrode active material particles and the negative electrode current collector. This enhances the anchor effect between the negative electrode binder and the negative electrode active material particles and between the negative electrode binder and the negative electrode current collector. Thus, the adhesion between the negative electrode active material particles is further improved, and the adhesion between the negative electrode active material layer and the negative electrode current collector is also further improved.

The present invention is not limited to the following examples; various modifications are possible without departing from the spirit thereof.

Example 1

Fabrication of Negative Electrode (Preparation of Negative Electrode Active Material Particles)

Fine polycrystalline silicon particles were introduced into a fluidized bed with an internal temperature of 800° C., and monosilane ($SiH_4$) was fed thereto to prepare granular polycrystalline silicon.

The granular polycrystalline silicon was then pulverized in a Jet mill and was classified using a classifier. As a result, a polycrystalline silicon powder (negative electrode active material particles) having a median size of 9 µm was obtained. The median size is the size at a cumulative volume of 50% in a particle size distribution measured by laser diffraction.

The crystallite size of the polycrystalline silicon powder was calculated by the Scherrer equation from the half-width of the (111) peak of silicon in powder X-ray diffraction. The crystallite size of the polycrystalline silicon powder was 44 nm. The BET specific surface area of the polycrystalline silicon powder was 0.9 $m^2/g$.

(Preparation of Negative Electrode Binder Precursor)

A negative electrode binder precursor solution a1 was prepared by dissolving an ester of 3,3',4,4'-benzophenonetetracarboxylic dianhydride, represented by formula (1), with two equivalents of ethanol and m-phenylenediamine, represented by formula (3), in N-methyl-2-pyrrolidone (NMP). The molar ratio of the compound represented by formula (1) to the compound represented by formula (3) (compound represented by formula (1):compound represented by formula (3)) was 100:100.

(Preparation of Negative Electrode Mixture Slurry)

The negative electrode active material particles, graphite particles, acting as negative electrode conductor particles and the negative electrode binder precursor solution a1 were mixed together. The average particle size of the graphite particles was 3 µm. The BET specific surface area of the graphite particles was 12.5 $m^2/g$. The mass ratio of the negative electrode active material particles, the negative electrode conductor particles, and the negative electrode binder (prepared by drying the negative electrode binder precursor solution a1 to remove NMP and effecting a polymerization reaction and an imidation reaction) was 89.53:3.73:6.74. The resulting mixture was further mixed with NMP to obtain a negative electrode mixture slurry having a viscosity of 75 mPa·s. The viscosity was measured using a TV-22 viscometer available from Toki Sangyo Co., Ltd.

(Fabrication of Negative Electrode)

The negative electrode mixture slurry was applied to one surface of a negative electrode current collector in air at 25° C. and was left standing for one minute to form a negative electrode active material layer. The negative electrode active material layer was then dried by passing it through a drying furnace at a line speed of 5 m/min. The drying furnace was composed of four chambers, each having a length of 1.5 m. The temperature of the first chamber was 110° C. The temperature of the second chamber was 120° C. The temperature of the third chamber was 120° C. The temperature of the fourth chamber was 120° C. The wind speed in the first to four chambers was set to 6 m/sec. The negative electrode current collector used was a copper alloy foil (C7025 alloy foil, composition: 96.2% by mass Cu, 3% by mass Ni, 0.65% by mass Si, and 0.15% by as Mg) having both surfaces thereof treated by electrodeposited copper roughening and having a thickness of 18 µm. The surface roughness Ra (JIS B 0601-1994) of each surface of the copper alloy foil was 0.25 µm. The mean peak spacing S (JIS B 0601-1994) of each surface of the copper alloy foil was 0.85 µm.

Thereafter, the negative electrode active material layer was also formed on the other surface of the negative electrode current collector. The negative electrode current collector having the negative electrode active material layer formed on each surface thereof was rolled in air at 25° C. The rolled negative electrode current collector was then cut into a rectangle with a length of 380 mm and a width of 52 mm and was heat-treated in an argon atmosphere at 400° C. for 10 hours to obtain a negative electrode. The mass per unit area of the negative electrode active material layer was 5.6 $mg/cm^2$. The thickness of the negative electrode active material layer was 56 µm.

A nickel plate was connected as a negative electrode current collector tab to an end of the negative electrode.

The following experiment was conducted to demonstrate that a polyimide compound was produced from the negative electrode binder precursor solution a1 by the heat treatment of the negative electrode active material layer. The negative electrode binder precursor solution a1 was dried in air at 120° C. to remove NMP and was then heat-treated in an argon atmosphere at 400° C. for 10 hours. The infrared (IR) absorption spectrum of the resulting sample was measured. As a result, a peak attributed to imide bonds was detected around 1,720 $cm^{-1}$. Thus, it was demonstrated that a polyimide compound was produced by a polymerization reaction and an imidation reaction during the heat treatment of the negative electrode binder precursor solution a1.

[Fabrication of Positive Electrode]

(Preparation of Lithium Transition Metal Composite Oxide)

$Li_2CO_3$ and $CoCO_3$ were mixed in a mortar at a molar ratio of Li to Co of 1:1. The mixture was heat-treated in an air atmosphere at 800° C. for 24 hours. Thereafter, it was pulverized to obtain a powder of a lithium cobalt composite oxide represented by $LiCoO_2$. The average particle size of the lithium cobalt composite oxide powder was 10 µm. The BET specific surface area of the resulting lithium cobalt composite oxide powder (positive electrode active material powder) was 0.37 $m^2/g$.

(Fabrication of Positive Electrode)

The $LiCoO_2$ powder, acting as a positive electrode active material powder, a carbon material powder, acting as positive electrode conductor particles, and polyvinylidene fluoride, acting as a positive electrode binder, were added to NMP, acting as a dispersion medium, and were kneaded to obtain a positive electrode mixture slurry. The mass ratio of the $LiCoO_3$ powder, the carbon material powder, and the polyvinylidene fluoride ($LiCoO_2$ powder:carbon material powder: polyvinylidene fluoride) was 95:2.5:2.5.

The positive electrode mixture slurry was applied to each surface of an aluminum foil, acting as a positive electrode current conductor, was dried, and was rolled to obtain a positive electrode. The thickness of the aluminum foil was 15 µm. The length of the aluminum foil was 402 mm. The width of the aluminum foil was 50 mm. The length of the coating on one main surface of the aluminum foil was 340 mm. The width of the coating on the main surface of the aluminum foil was 50 mm. The length of the coating on the other main surface of the aluminum foil was 270 mm. The width of the coating on the other main surface of the aluminum foil was 50 mm. The amount of active material layer on the aluminum foil was 48 $mg/cm^2$ in the region where the active material layer was formed on each surface thereof. The total thickness of the active material layer was 143 µm in the region where the active material layer was formed on each surface thereof.

An aluminum plate was connected as a positive electrode current collector tab to a portion not coated with the positive electrode active material layer at an end of the positive electrode.

[Preparation of Non-Aqueous Electrolyte Solution]

Fluoroethylene carbonate (FEC) and methyl ethyl carbonate (MEC) were mixed in an argon atmosphere. The volume ratio (FEC:MEC) of fluoroethylene carbonate (FEC) to methyl ethyl carbonate (MEC) was 2:8. Lithium hexafluorophosphate ($LiPF_6$) was dissolved in the resulting mixed solvent. The concentration of $LiPF_6$ was 1 mol/L. Carbon dioxide gas was then dissolved in the solution to a concentration of 0.4% by mass to obtain a non-aqueous electrolyte solution.

[Fabrication of Electrode Assembly]

Figure 1:
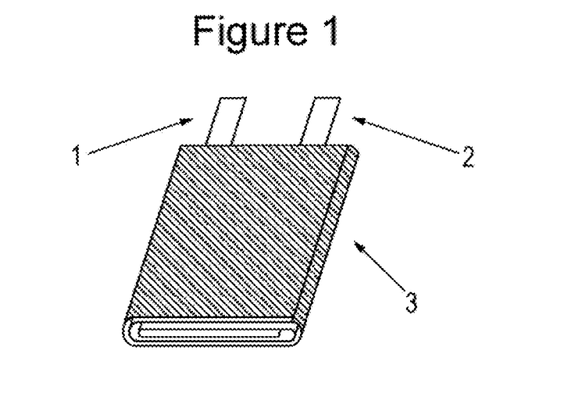

The positive electrode and the negative electrode were placed opposite each other with a separator having a thickness of 20 μm therebetween and were wound around a cylindrical core into a spiral such that the positive electrode tab and the negative electrode tab were both located on the outermost side thereof. Thereafter, the core was removed to obtain a spiral electrode assembly. The spiral electrode assembly was then pressed into a flat electrode assembly. FIG. 1 shows a schematic perspective view of the thus-fabricated flat electrode assembly. As shown in FIG. 1, an end of a positive electrode current collector tab 1 and an end of a negative electrode current collector tab 2 extend out of an electrode assembly 3. The separator used was a polyethylene microporous film. The length of the polyethylene microporous film was 450 mm. The width of the polyethylene microporous film was 54.5 mm. The piercing strength of the polyethylene microporous film was 340 g. The porosity of the polyethylene microporous film was 45%.

[Fabrication of Battery]

Figure 2:
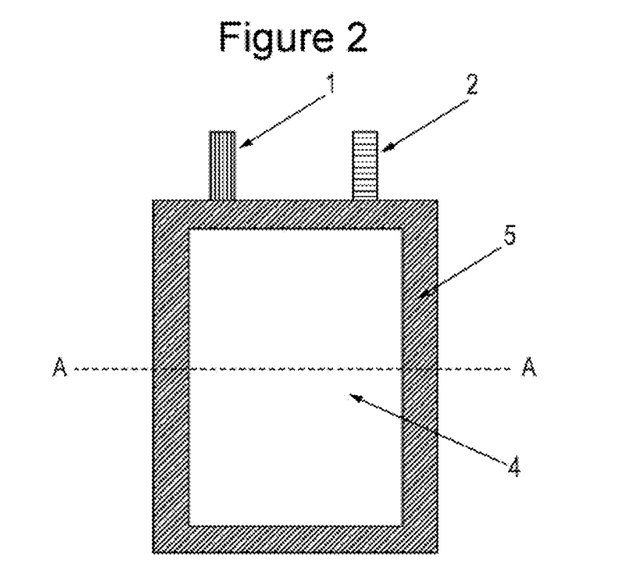
Figure 3:
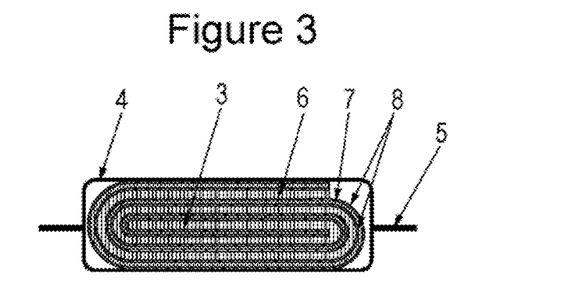
FIG. 3 is a schematic sectional view taken along line A-A in FIG. 2.

The flat electrode assembly and the non-aqueous electrolyte solution were inserted into an aluminum laminate case in a carbon dioxide atmosphere at 25° C. and 1 atm to fabricate a flat battery A1 having the structure shown in FIGS. 2 and 3.

The battery A1 includes an aluminum laminate case 4. The case 4 has a closed portion 5 where ends of aluminum foils are heat-sealed. The battery A1 further includes a positive electrode current collector tab 1, a negative electrode current collector tab 2, and an electrode assembly 3 (flat electrode assembly) including a positive electrode 6 and a negative electrode 7 wound with a separator 8 therebetween.

Comparative Example 1

A battery B1 was fabricated as in Example 1 except that the applied negative electrode mixture slurry was dried under the following conditions.

The negative electrode mixture slurry was passed through a drying furnace at a line speed of 1 m/min. The temperature of the first chamber was 60° C. The temperature of the second chamber was 60° C. The temperature of the third chamber was 60° C. The temperature of the fourth chamber was 120° C. The wind speed in the first chamber was set to 2 m/sec. The wind speed in the second chamber was set to 2 m/sec. The wind speed in the third chamber was set to 2 m/sec. The wind speed in the fourth chamber was set to 6 m/sec.

[Evaluation of Charge-Discharge Cycle Performance]

The batteries A1 and B1 were each evaluated for charge-discharge cycle, performance under the following charge-discharge cycle, conditions.

(Charge-Discharge Cycle Conditions)

Charge Conditions for First Cycle

The batteries A1 and B1 were charged at a constant current of 50 mA for 4 hours. The batteries A1 and B1 were then charged at a constant current of 200 mA until the battery voltage reached 4.2 V. The batteries A1 and B1 were further charged at a constant voltage of 4.2 V until the current reached 50 mA.

Discharge Conditions for First Cycle

The batteries A1 and B1 were discharged at a constant current of 200 mA until the battery voltage reached 2.75 V.

Charge Conditions for Second and Subsequent Cycles

The batteries A1 and B1 were charged at a constant current of 1,000 mA until the battery voltage reached 4.2 V. The batteries A1 and B1 were further charged at a constant voltage of 4.2 V until the current reached 50 mA.

Discharge Conditions for Second and Subsequent Cycles

The batteries A1 and B1 were discharged at a constant current of 1,000 mA until the battery voltage reached 2.75 V.

The cycle life was determined by the following calculation.

The cycle life was determined as the number of cycles at which the capacity retention was 90%. The capacity retention is the discharge capacity for the nth cycle divided by the discharge capacity for the first cycle.

The cycle lives of the batteries A1 and B1 are shown in Table 1.

[Evaluation of Liquid Absorbency of Negative Electrode Active Material Layer]

The negative electrode active material layers of the batteries A1 and B1 were each evaluated for liquid absorbency.

A pipette was used to drop 2 μl of propylene carbonate (PC) on the surface of the negative electrode active material layer. After dropping, the time (in sec) taken for the PC to completely permeate the negative electrode active material layer was measured. This time was used to determine the liquid absorbency by the following equation.

Liquid absorbency=1/time required to complete permeation)

Table 1 shows the liquid absorbency of the batteries A1 and B1. Table 1 also shows the drying conditions of the negative electrode mixture slurries and the viscosity of the negative electrode mixture slurries.

TABLE 1

| | | Negative electrode fabrication conditions | | | | |
|---|---|---|---|---|---|---|
| Battery | Line speed (m/min) | Temperature (° C.) 1st chamber/ 2nd chamber/ 3rd chamber/ 4th chamber | Wind speed (m/sec) 1st chamber/ 2nd chamber/ 3rd chamber/ 4th chamber | Viscosity of negative electrode mixture slurry (mPa·s) | Liquid absorbency of negative electrode active material layer (1/sec) | Cycle life |
| Battery A1 | 5 | 110/120/120/120 | 6/6/6/6 | 75 | 0.013 | 95 |
| Battery A2 | 1 | 60/60/60/120 | 2/2/2/6 | 75 | 0.011 | 79 |

Table 1 shows that the negative electrode active material layer of the battery A1 had a higher liquid absorbency than the negative electrode active material layer of the battery B1. Table 1 also shows that the battery A1 had a longer cycle life than the battery B2.

[SEM and EDS Measurements of Surface of Negative Electrode Active Material Layer]

Example 2

A negative electrode mixture slurry was prepared as in Example 1 except that the negative electrode binder precursor used was a mixture of 70% by mass of a negative electrode binder precursor and 30% by mass of a polymer-type polyimide binder (available from Ube industries, Ltd. under the trade name "U-Varnish A"). The negative electrode binder precursor was substantially the same as the negative electrode binder precursor used in Example 1. The viscosity of the negative electrode mixture slurry was 110 mPa·s. A negative electrode and a battery were fabricated as in Example 1.

The battery fabricated in Example 2 was evaluated for charge-discharge cycle performance. The charge-discharge cycle performance was measured under the same conditions as the above charge-discharge cycle conditions. The charge-discharge cycle life of the battery fabricated in Example 2 was 98. This result demonstrates that the cycle life of the battery fabricated in Example 2 was similar to that of the battery A1.

The surfaces of the negative electrodes fabricated in Examples 1 and 2 and Comparative Example 1 were examined by scanning electron microscopy (SEM). The surfaces of the negative electrodes fabricated in Examples 1 and 2 and Comparative Example 1 were also examined by carbon element (C) mapping by energy-dispersive spectroscopy (SEM-EDS). Carbon element (C) is contained in the negative electrode binder and the negative electrode conductor particles; therefore, the mapping of carbon element (C) allows the estimation of the total distribution of the negative electrode binder and the negative electrode conductor particles.

Figure 4:
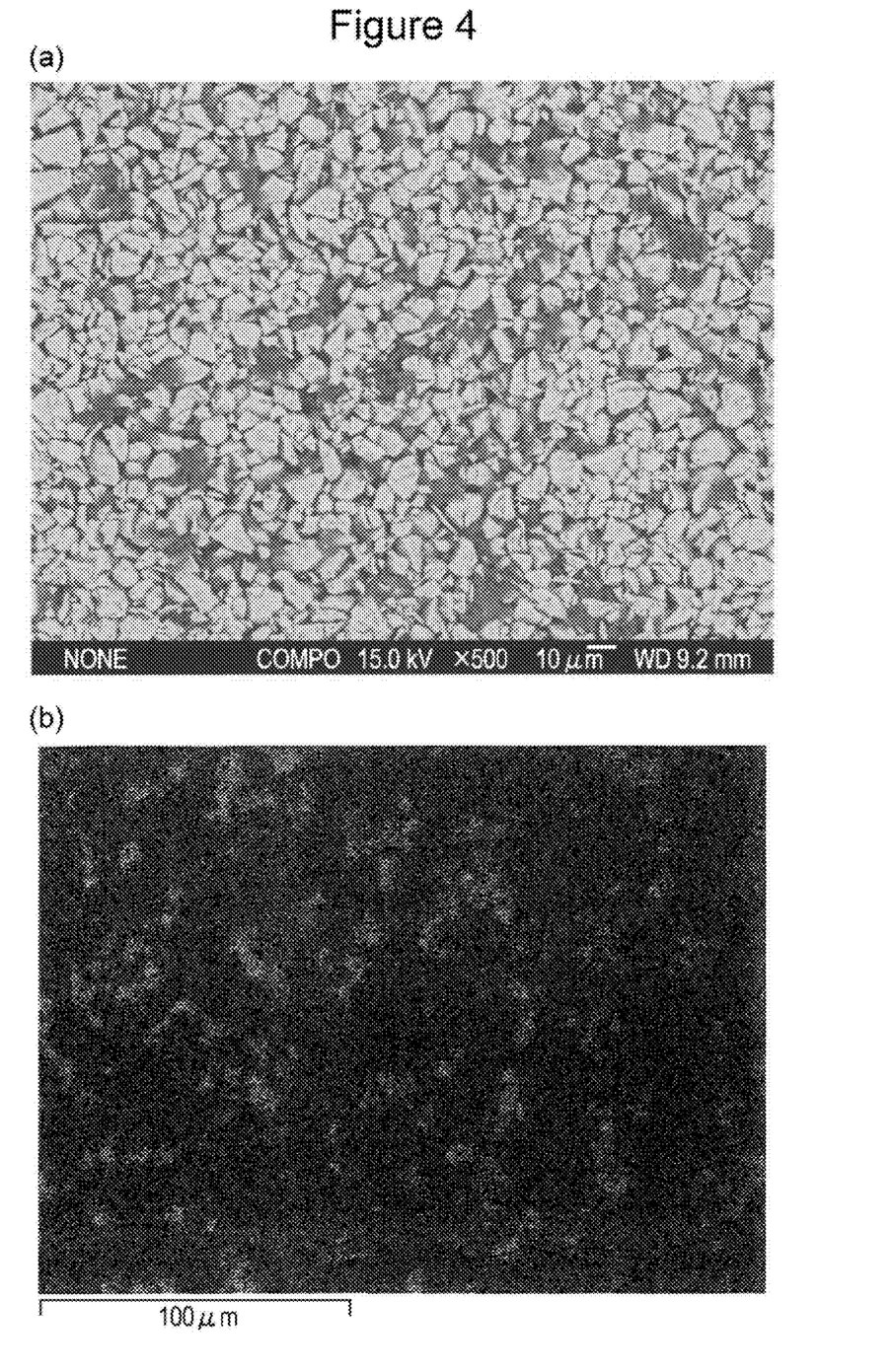
FIG. 4(a) is a scanning electron microscopy (SEM) back-scattered electron image of a surface of a negative electrode in an example.
FIG. 4(b) is an energy-dispersive spectroscopy (EDS) image of the surface of the negative electrode in the example.
Figure 5:
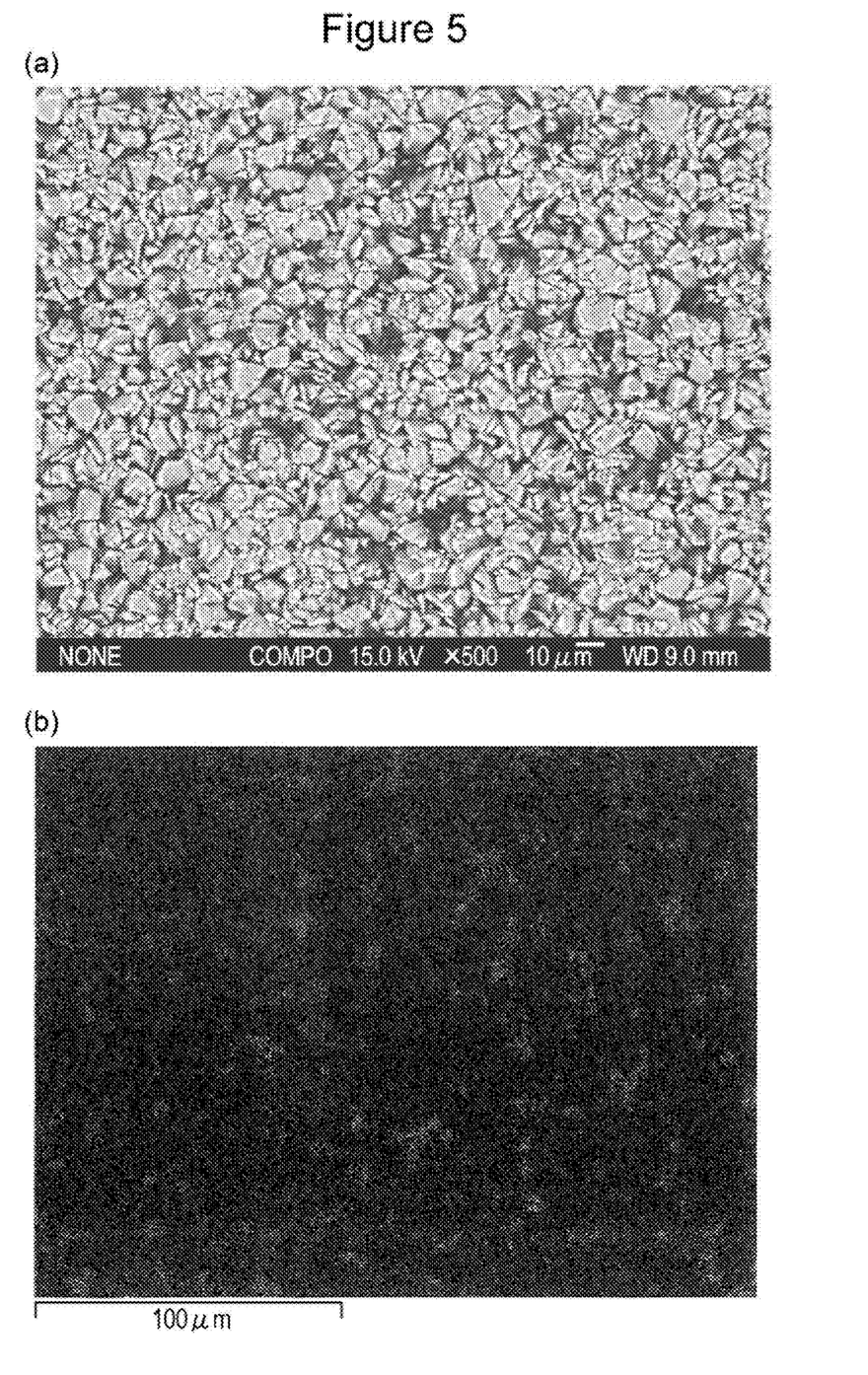
FIG. 5(a) is a scanning electron microscopy (SEM) back-scattered electron image of a surface of a negative electrode in another example.
FIG. 5(b) is an energy-dispersive spectroscopy (EDS) image of the surface of the negative electrode in the other example.
Figure 6:
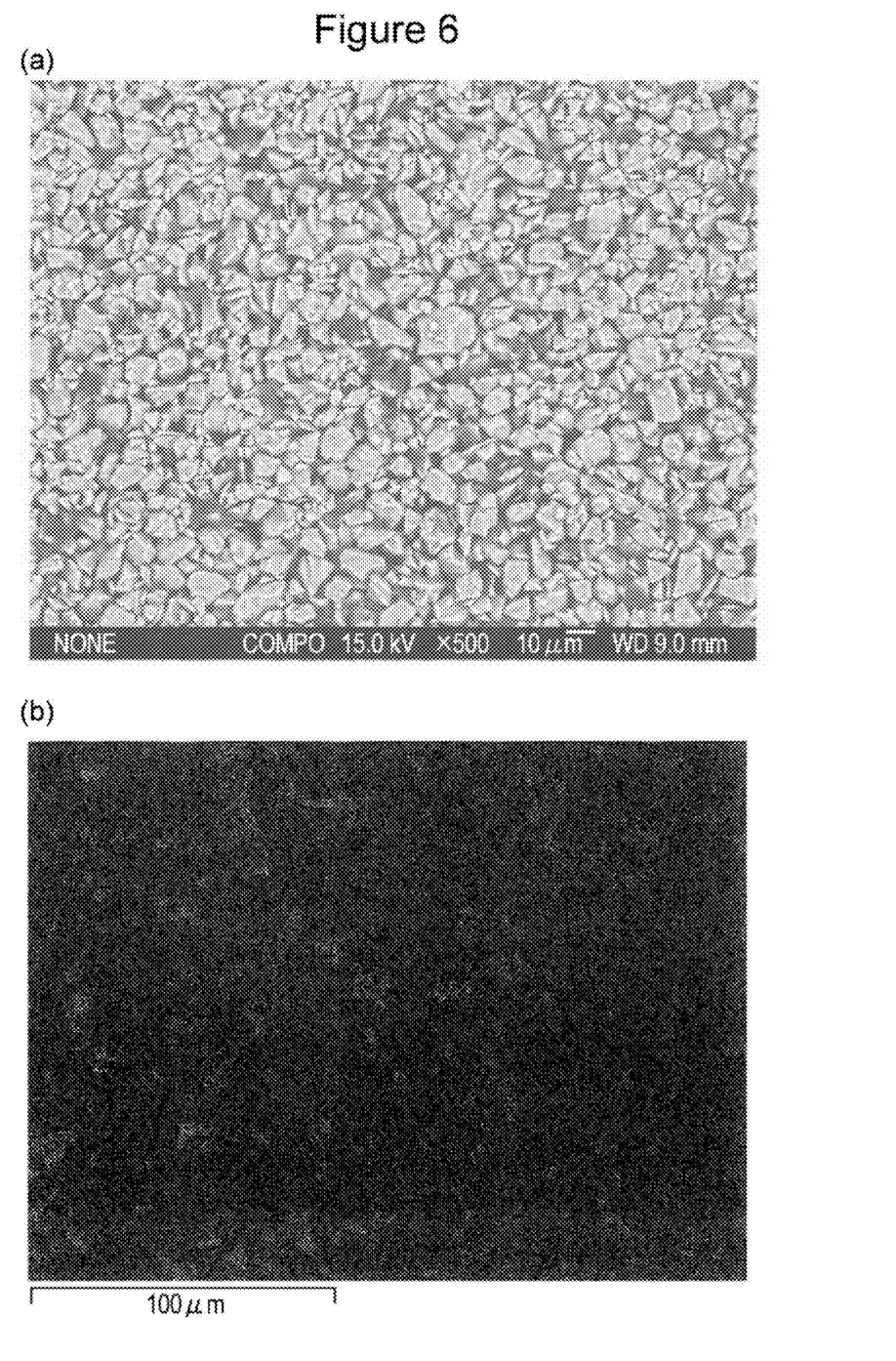
FIG. 6(a) is a scanning electron microscopy (SEM) back-scattered electron image of a surface of a negative electrode in a comparative example.
FIG. 6(b) is an energy-dispersive spectroscopy (EDS) image of the surface of the negative electrode in the comparative example.

FIG. 4(a) is a scanning electron microscopy (SEM) backscattered electron image of the surface of the negative electrode of Example 1. FIG. 5(a) is a scanning electron microscopy (SEM) backscattered electron image of the surface of the negative electrode of Example 2. FIG. 6(a) is a scanning electron microscopy (SEM) backscattered electron image of the surface of the negative electrode of Comparative Example 1. FIG. 4(b) is an EDS mapping image of the surface of the negative electrode of Example 1. FIG. 5(b) is an EDS mapping image of the surface of the negative electrode of Example 2. FIG. 6(b) is an EDS mapping image of the surface of the negative electrode of Comparative Example 1. The EDS mapping images display carbon element (C) in white.

The mass ratio of the negative electrode active material particles, the negative electrode conductor particles, and the negative electrode binder in the negative electrode active material layer (negative electrode active material particles: negative electrode conductor particles:negative electrode binder) is 89.53:3.73:6.74. The true density of the negative electrode active material particles is 2.34 g/cm³. The true density of the negative electrode conductor particles is 2.26 g/cm³. The true density of the negative electrode binder is 1.4 g/cm³. Hence, the volume ratio of the negative electrode active material particles, the negative electrode conductor particles, and the negative electrode binder in the negative electrode active material layer negative electrode active material particles:negative electrode conductor particles:negative electrode binder) is 85.6:3.65:10.71. Thus, the total volume fraction of the negative electrode conductor particles and the negative electrode binder in the negative electrode active material layer is 14.4% by volume.

Detection of carbon element (C) by SEM-EDS analysis revealed that the proportion of carbon element (C) in the surface of the active material layer in Example 1 was 15.5% by area, that the proportion of carbon element (C) in the surface of the active material layer in Example 2 (FIG. 5(b)) was 16.1% by area, and that the proportion of carbon element (C) in the surface of the active material layer in Comparative Example 1 (FIG. 6(b)) was 14.3% by area.

As described above, the total volume fraction of the negative electrode conductor particles and the negative electrode binder in the negative electrode active material layer is 14.4% by volume. The above results show that, in Examples 1 and 2, the concentration of carbon element (C) in the surface of the negative electrode active material layer was higher than the concentration of carbon element (C) in the center of the negative electrode active material layer. A comparison of FIG. 4(b) (Example 1) and FIG. 5(b) (Example 2) with FIG. 6(b) (Comparative Example 1) also shows that, in Examples 1 and 2, the concentration of carbon element (C) in the surface of the negative electrode active material layer was higher than the concentration of carbon element (C) in the center of the negative electrode active material layer.

The negative electrode binder is dispersed in small dots in the surface of the negative electrode active material particles. The negative electrode conductor particles, i.e., graphite particles, are relatively closely clustered. In the SEM images, the black portions are assumed to be clusters of graphite particles. The black portions in FIG. 4(a), which shows the SEM image of Example 1, and FIG. 5(a), which shows the SEM image of Example 2, have a large area than those in FIG. 6(a), which shows the SEM image of Comparative Example 1. This indicates that carbon element (C) is also clustered in the EDS images in FIGS. 4(b) and 5(b). Thus, the high concentration of carbon element (C) in the surface layer of the negative electrode active material layer facing away from the negative electrode current collector is attributed to the fact that the negative electrode conductor particles were present in large amounts in the surface layer of the negative electrode active material layer facing away from the negative electrode current collector.

The above results suggest that the negative electrode active material layer had high electrolyte solution retention (liquid absorbency and retention) because the negative electrode conductor particles were present in large amounts in the surface layer of the negative electrode active material layer facing away from the negative electrode current collector. This will allow a sufficient number of lithium ions to be supplied to the negative electrode active material particles even after the negative electrode active material particles experience a change in volume during charge and discharge, thereby inhibiting degradation of the negative electrode active material particles and providing superior charge-discharge performance.

The distribution of the negative electrode binder can be estimated from an oxygen element (O) mapping image because the negative electrode binder contains oxygen element. Accordingly, a cross-section of the negative electrode fabricated in Example 1 was examined by oxygen element (O) mapping by energy-dispersive spectroscopy (SEM-EDS) using a scanning electron microscope (SEM) available from JEOL Ltd. The acceleration voltage was 15 keV. The irradiation current was 60 nA. The field of view measured 22 µm (the thickness of the negative electrode active material layer)×44 µm (twice the thickness of the negative electrode active material layer).

Figure 7:
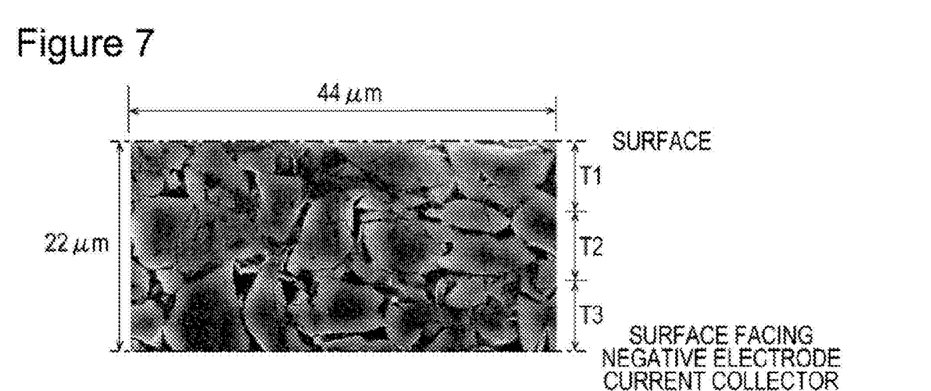
FIG. 7 is an oxygen element (O) mapping image superimposed on a scanning electron microscopy (SEM) image of a cross-section of a negative electrode of Example 1.
Figure 8:
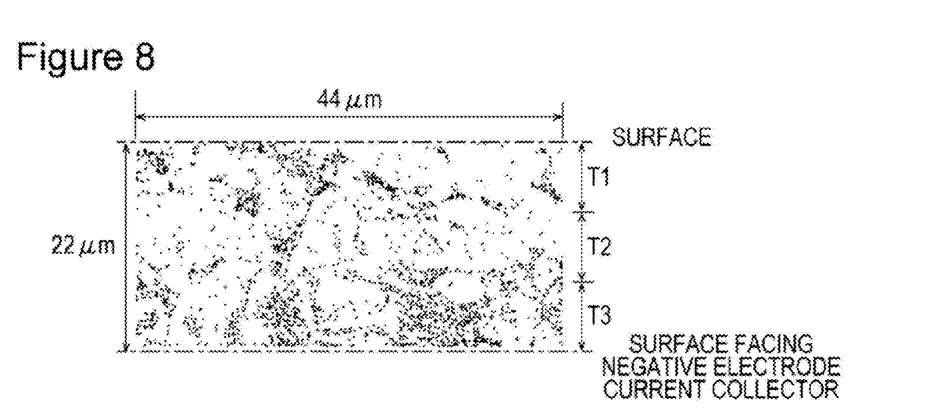

FIG. 7 shows an oxygen element (O) mapping image superimposed on a scanning electron microscopy (SEM) image of the cross-section of the negative electrode of Example 1. FIG. 8 shows an oxygen element (O) mapping image of the cross-section of the negative electrode of Example 1.

The ratio (T1/entire) of the area of oxygen element (O) in a portion T1 with a depth of 22/3 μm from the surface of the negative electrode active material layer facing away from the negative electrode current collector to the area of oxygen element (O) in the entire field of view was determined from the mapping image shown in FIG. 8. The ratio (T1/entire) of the area of oxygen element (O) in a portion T2 with a depth of 22/3 μm in the center of the negative electrode active material layer to the area of oxygen element (O) in the entire field of view was determined from the mapping image shown in FIG. 8. The ratio (T1/entire) of the area of oxygen element (O) in a portion T3 with a depth of 22/3 μm from the surface of the negative electrode active material layer facing the negative electrode current collector to the area of oxygen element (O) in the entire field of view was determined from the mapping image shown in FIG. 8. The results are shown in Table 2.

Figure 9:
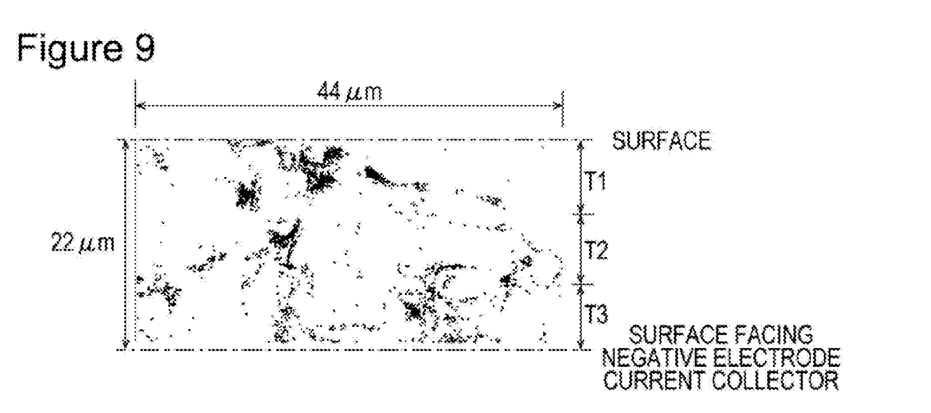
FIG. 9 is a carbon element (C) mapping image of the cross-section of the negative electrode of Example 1.

Similarly, the cross-section of the negative electrode fabricated in Example 1 was examined by carbon element (C) mapping. FIG. 9 shows a carbon element (C) mapping image of the cross-section of the negative electrode of Example 1.

The ratio (T1/entire) of the area of carbon element (C) in a portion T1 with a depth of 22/3 μm from the surface of the negative electrode active material layer facing away from the negative electrode current collector to the area of carbon element (C) in the entire field of view was determined from the mapping image shown in FIG. 9. The ratio (T1/entire) of the area of carbon element (C) in a portion T2 with a depth of 22/3 μm in the center of the negative electrode active material layer to the area of carbon element (C) in the entire field of view was determined from the mapping image shown in FIG. 9. The ratio (T1/entire) of the area of carbon element (C) in a portion T3 with a depth of 22/3 μm from the surface of the negative electrode active material layer facing the negative electrode current collector to the area of carbon element (C) in the entire field of view was determined from the mapping image shown in FIG. 9. The results are shown in Table 2.

TABLE 2

|  | Proportion of carbon element (C) | | Proportion of oxygen element (O) | |
| --- | --- | --- | --- | --- |
|  | (%) | Normalized value | (%) | Normalized value |
| T1/entire | 57% | 1 | 42% | 1 |
| T2/entire | 16% | 0.28 | 25% | 0.60 |
| T3/entire | 28% | 0.49 | 33% | 0.79 |

The total distribution of the negative electrode conductor particles and the negative electrode binder in Example 1 can be estimated from the results for the proportion of carbon element (C) shown in Table 2. The distribution of the negative electrode binder in Example 1 can be estimated from the results for the proportion of oxygen element (O). Thus, the distribution of the negative electrode conductor particles in Example 1 can be estimated taking into account both of the results for the proportion of carbon element (C) and the results for the proportion of oxygen element (O).

The results for the proportion of carbon element (C) shown in Table 2 demonstrate that the proportion of carbon element in the portion T1 of the negative electrode active material layer facing away from the negative electrode current collector was higher than those of the portions T2 and T3. This means that at least one of the negative electrode conductor particles and the negative electrode binder was localized in the portion T1.

The results for the proportion of oxygen element (O) shown in Table 2 demonstrate that the proportion of oxygen element in the portion T1 of the negative electrode active material layer facing away from the negative electrode current collector was higher than those of the portions T2 and T3. This means that the negative electrode binder was localized in the portion T1.

The difference between the proportion of carbon element (C) in the portion T1 of the negative electrode active material layer facing away from the negative electrode current collector and the proportion of carbon element (C) in the central portion T2 of the negative electrode active material layer (corresponding to the difference between the total proportion of the negative electrode binder and the negative electrode active material particles in the portion T1 and the total proportion of the negative electrode binder and the negative electrode active material particles in the portion T2) is larger than the difference between the proportion of oxygen element (O) in the portion T1 and the proportion of oxygen element (O) in the portion T2 (corresponding to the difference between the proportion of the negative electrode binder in the portion T1 and the proportion of the negative electrode binder in the portion T2). This means that not only the negative electrode binder, but also the negative electrode conductor particles were localized in the portion T1. That is, it is presumed that the difference between the proportion of carbon element (C) in the portion T1 and the proportion of carbon element (C) in the central portion T2 is larger than the difference between the proportion of oxygen element (O) in the portion T1 and the proportion of oxygen element (O) in the portion T2 because not only the negative electrode binder, but also the negative electrode conductor particles were localized in the portion T1. Thus, the above results demonstrate that not only the negative electrode binder, but also the negative electrode conductor particles were present in larger amounts in the portion T1 than in the portion T2 in Example 1.

A comparison between the concentrations of oxygen element (O) and carbon element (C) in the portions T1 and T3 also shows that the negative electrode conductor particles were localized in the portion T1 of the negative electrode active material layer facing away from the negative electrode current collector.

Example 3

In this example, lithium nickel cobalt aluminum composite oxide was used as the negative electrode active material.
[Fabrication of Positive Electrode]
(Preparation of Lithium Transition Metal Composite Oxide)

LiOH and a composite hydroxide containing nickel as the major metal component thereof ($Ni_{0.80}Co_{0.17}Al_{0.03}(OH)_2$) were mixed in a mortar and were heat-treated in an air atmosphere at 720° C. for 20 hours. The molar ratio (LiOH:$Ni_{0.08}Co_{0.17}Al_{0.03}(OH)_2$) to the composite hydroxide containing nickel as the major metal component thereof ($Ni_{0.80}Co_{0.17}Al_{0.03}(OH)_2$) was 1.05:1. Thereafter, the resulting material was pulverized to obtain a powder of a lithium nickel cobalt aluminum composite oxide represented by $Li_{1.05}Ni_{0.80}Co_{0.17}Al_{0.03}O_2$. The average particle size of the lithium nickel cobalt aluminum composite oxide powder was 10 μm. The BET specific surface area of the lithium nickel cobalt aluminum composite oxide powder (positive electrode active material) was 0.39 m²/g.

(Fabrication of Positive Electrode)

The thus-prepared positive electrode active material powder, a carbon material powder, acting as positive conductor particles, and polyvinylidene fluoride, acting as a positive electrode binder, were added to NMP, acting as a dispersion medium, and were kneaded to prepare a positive electrode mixture slurry. The mass ratio of the positive electrode active material, the carbon material powder, and the polyvinylidene fluoride (positive electrode active material:carbon material powder:polyvinylidene fluoride) was 95:2.5:2.5.

The positive electrode mixture slurry was applied to each surface of an aluminum foil, acting as a positive current conductor, was dried, and was rolled. The thickness of the aluminum foil was 15 µm. The length of the aluminum foil was 402 mm. The width of the aluminum foil was 50 mm. The length of the coating on one main surface of the aluminum foil was 340 mm. The width of the coating on the main surface of the aluminum foil was 50 mm. The length of the coating on the other main surface of the aluminum foil was 270 mm. The width of the coating on the other main surface of the aluminum foil was 50 mm. The amount of active material layer on the aluminum foil was 36.6 mg/cm$^2$ in the region where the active material layer was formed on each surface thereof. The total thickness of the active material layer on the aluminum foil was 117 µm in the region where the active material layer was formed on each surface thereof.

An aluminum plate was connected as a positive electrode current collector tab to a portion not coated with the positive electrode active material layer at an end of the positive electrode.

[Fabrication of Battery]

A battery A2 was fabricated as in Example 1 except that the above positive electrode was used.

Comparative Example 2

A battery B2 was fabricated as in Comparative Example 1 except that the positive electrode used was substantially the same as the positive electrode fabricated in Example 3.

[Evaluation of Charge-Discharge Cycle Performance and Liquid Absorbency of Active Material Layer]

The batteries A2 and B2 were each evaluated for cycle life and liquid absorbency in the same manner as described above. The results are shown in Table 3.

TABLE 3

| Battery | Positive electrode | Liquid absorbency of negative electrode active material layer (l/sec) | Cycle life |
|---|---|---|---|
| Battery A2 | $Li_{1.05}Ni_{0.80}Co_{0.17}Al_{0.03}O_2$ | 0.013 | 103 |
| Battery B2 | $Li_{1.05}Ni_{0.80}Co_{0.17}Al_{0.03}O_2$ | 0.011 | 78 |

The results shown in Table 3 show that, for lithium secondary batteries using lithium nickel cobalt aluminum composite oxide as a positive electrode active material, the battery A2, which included a negative electrode fabricated by applying a negative electrode mixture slurry having a viscosity of 70 to 120 mPa·s and drying the negative electrode mixture slurry with the initial drying temperature set to 100° C. to 150° C., had a longer cycle life than the battery B2.

The difference in cycle life between the batteries A2 and B2, which used lithium nickel cobalt aluminum composite oxide as a positive electrode active material, is larger than the difference in cycle life between the batteries A1 and B1 (see Table 1), which used lithium cobalt composite oxide as a positive electrode active material. This is explained as follows. The crystal structure of lithium nickel cobalt aluminum composite oxide is more readily degraded at high potential than that of lithium cobalt composite oxide, and accordingly more Ni and Co dissolve. It is presumed, however, that the side reaction between the dissolved Ni and Co and the electrolyte solution on the surface of the negative electrode was inhibited because the negative electrode conductor particles were present in large amounts in the surface layer of the negative electrode active material layer facing away from the negative electrode current collector.

INDUSTRIAL APPLICABILITY

The present invention is applicable to, for example, power supplies for driving mobile information terminals such as cellular phones, notebook personal computers, and PDAs, particularly to applications that require high energy density. The present invention is also expected to find applications in high-power devices such as HEVs and power tools.

REFERENCE SIGNS LIST 1 positive electrode current collector tab
2 negative electrode current collector tab
3 electrode assembly
4 case
5 closed portion of case
6 positive electrode
7 negative electrode
8 separator

The invention claimed is:

1. A lithium secondary battery comprising a positive electrode, a negative electrode and a nonaqueous electrolyte, including:
   a negative electrode current collector; and
   a negative electrode active material layer disposed on the negative electrode current collector and containing negative electrode active material particles, negative electrode conductor particles, and a negative electrode binder,
   wherein the concentration of the negative electrode conductor particles in a surface layer of the negative electrode active material layer facing away from the negative electrode current collector is higher than the concentration of the negative electrode conductor particles in a center of the negative electrode active material layer, and
   wherein the difference between the concentration of the negative electrode conductor particles in the surface layer of the negative electrode active material layer facing away from the negative electrode current collector and the concentration of the negative electrode conductor particles in the center of the negative electrode active material layer is larger than the difference between the concentration of the negative electrode binder in the surface layer of the negative electrode active material layer facing away from the negative electrode current collector and the concentration of the negative electrode binder in the center of the negative electrode active material layer.

2. The lithium secondary battery according to claim 1, wherein the negative electrode active material particles have a larger average particle size than the negative electrode conductor particles.

3. The lithium secondary battery according to claim 1, wherein the negative electrode conductor particles have a larger BET specific surface area than the negative electrode active material particles.

4. The lithium secondary battery according to claim 1, wherein the negative electrode active material particles comprise at least one of silicon and a silicon alloy.

5. The lithium secondary battery according to claim 1, wherein the negative electrode conductor particles are graphite particles.

6. The lithium secondary battery according to claim 1, further comprising a positive electrode containing a lithium transition metal composite oxide represented by the chemical formula $Li_aNi_{1-b-c}Co_bAl_cO_2$ (where a, b, and c satisfy $0<a\leq1.1$, $0.1\leq b\leq0.3$, and $0.03\leq c\leq0.10$).

* * * * *